(12) United States Patent
Selcuklu et al.

(10) Patent No.: US 12,508,926 B2
(45) Date of Patent: Dec. 30, 2025

(54) DOCKING AND RECHARGING SYSTEM FOR BATTERY POWERED PERSONAL MOBILITY VEHICLES

(71) Applicant: ACTON, INC., Reno, NV (US)

(72) Inventors: Ahmet Cagri Selcuklu, Kocaeli (TR); Evren Yazici, Kocaeli (TR); Ender Goksen Atalay, Kocaeli (TR)

(73) Assignee: ACTON, INC., Reno, NV (US)

( * ) Notice: Subject to any disclaimer, the term of this patent is extended or adjusted under 35 U.S.C. 154(b) by 952 days.

(21) Appl. No.: 17/763,214

(22) PCT Filed: Oct. 23, 2019

(86) PCT No.: PCT/TR2019/050890
§ 371 (c)(1),
(2) Date: Mar. 24, 2022

(87) PCT Pub. No.: WO2021/080525
PCT Pub. Date: Apr. 29, 2021

(65) Prior Publication Data
US 2023/0331105 A1    Oct. 19, 2023

(51) Int. Cl.
*B60L 53/16* (2019.01)
*B60L 53/65* (2019.01)
(Continued)

(52) U.S. Cl.
CPC ............... *B60L 53/16* (2019.02); *B60L 53/65* (2019.02); *B60L 53/68* (2019.02); *B62H 3/10* (2013.01);
(Continued)

(58) Field of Classification Search
CPC .......... B60L 53/16; B60L 53/65; B60L 53/68; B60L 53/31; B60L 53/66; B62H 3/10; B62H 3/04; B62H 3/00
See application file for complete search history.

(56) References Cited

U.S. PATENT DOCUMENTS

2013/0314205 A1   11/2013   Neupert et al.
2020/0231053 A1*   7/2020   Saint-Germain ....... B60L 50/20

FOREIGN PATENT DOCUMENTS

| CA | 3069577 A1 | 1/2019 |
| CN | 204895678 U | 12/2015 |
| JP | 2003118671 A | 4/2003 |

* cited by examiner

*Primary Examiner* — David V Henze-Gongola

(57) ABSTRACT

An engagement unit for co-operation with an attachment unit in a docking and recharging system for a power assisted personal mobility vehicle having a battery accumulating electronic power to be supplied to an electric motor is provided. The engagement unit includes a first electric terminal module configured to establish an electrical connection with a second electric terminal module provided at the attachment unit; a locking means configured to secure the attachment unit when the attachment unit is in a lockable position and an actuation means of the attachment unit is fully engaged with the engagement unit; and a control module configured to receive an identification signal from an identification means provided in the attachment unit. Moreover, the attachment unit for co-operation with the engagement unit includes the second electric terminal module configured to establish the electrical connection with the first electric terminal module provided at the attachment unit.

17 Claims, 10 Drawing Sheets

(51) Int. Cl.
  *B60L 53/68* (2019.01)
  *B62H 3/10* (2006.01)
  *B62H 5/00* (2006.01)
(52) U.S. Cl.
  CPC ....... *B60L 2200/12* (2013.01); *B60L 2200/24* (2013.01); *B62H 5/00* (2013.01)

DOCKING AND RECHARGING SYSTEM FOR BATTERY POWERED PERSONAL MOBILITY VEHICLES

CROSS REFERENCE TO THE RELATED APPLICATIONS

This application is the national stage entry of International Application No. PCT/TR2019/050890, filed on Oct. 23, 2019, the entire contents of which are incorporated herein by reference.

TECHNICAL FIELD

The present invention relates to a docking and recharging system for a battery powered personal mobility vehicle and more particular to an engagement unit and an interrelated attachment unit in a docking and recharging system for attaching and recharging a scooter or an electric bicycle.

BACKGROUND

Electrically powered vehicles are becoming more important in view of increasing energy costs and the demand for reduced emissions of traffic. Nowadays, especially lightweight electric vehicles having weight of not more than 500 kg, as for instance an electric two-wheeler or scooter or an electric bicycle, are widely used.

In the art, the personal mobility vehicles such as bikes are attached in a parking base to prevent them from being able to be released by anybody. These parking bases have attachments means based on mechanical release elements by means of an electrical operation. However, for the lightweight electric vehicles, there are no standard regulations that provides local or universal use of recognition, locking and charging functions. This causes irregularities and leads security problems. Especially in public areas, at self-service stations open to the public, there is no control if a correct connection takes place between the vehicle or a docking station. It is desirable to improve a docking and recharging system for lightweight electrically powered vehicles considering the abovementioned shortcomings.

A prior art publication in the technical field of the present invention may be referred to as US2013314205 (A1) among others, the document disclosing a modular vehicle system, having an a lightweight electric vehicle, and at least one module which can be connected to the electric vehicle.

SUMMARY

Primary object of the present invention is to overcome the abovementioned shortcomings encountered in the prior art.

Another object of the present invention is to provide a docking and recharging system with increased safety of operation where the connection can take place particularly easy, safe and protected from interferences by unauthorized persons.

Another object of the present invention is to provide a docking and recharging system that allows a safe connection between the attachment unit installed onto a personal mobility vehicle and a docking station.

Another object of the present invention is to provide a docking and recharging system for lightweight electric vehicles (e.g. scooter, electric bicycle) that eliminates a need of a locking and recognition system.

Another object of the present invention is to provide an attachment unit for the docking and recharging system that enables use of different sized mobility vehicles with an adjustable lock ring. Another object of the present invention is to provide an engagement unit for the docking and recharging system adapted for use with an attachment unit for effectively recognizing and locking a battery powered personal mobility vehicle.

The present invention proposes an engagement unit for co-operation with a separate attachment unit in a docking and recharging system for a power assisted personal mobility vehicle having a battery that accumulates electronic power to be supplied to an electric motor. According to the present invention, said engagement unit comprises an electric terminal module configured to establish an electrical connection with the corresponding an electric terminal module provided at the attachment unit; a locking means configured to secure the attachment unit when the attachment unit is in a lockable position and an actuation means of the attachment unit is fully engaged within the engagement unit; and a control module configured to receive an identification signal from an identification means provided in the attachment unit. According to the present invention, other interrelated product attachment is attachable to a power assisted personal mobility vehicle for docking and recharging. Said attachment unit for co-operation with the engagement unit comprises: an electric terminal module configured to establish an electrical connection with the corresponding electric terminal module provided at the attachment unit; an actuation means arranged to engage within the engagement unit; and an identification means arranged to be in communication with the control module of the engagement unit wherein said attachment unit is attachable to the battery powered personal mobility vehicle. The docking and recharging system for a battery powered personal mobility vehicle, comprises the removable attachment unit and the engagement unit.

BRIEF DESCRIPTION OF THE DRAWINGS

The accompanying drawings are given solely for the purpose of exemplifying the invention whose advantages over prior art were outlined above and will be explained in detail hereinafter.

LIST OF REFERENCE SIGNS

Figure 1:
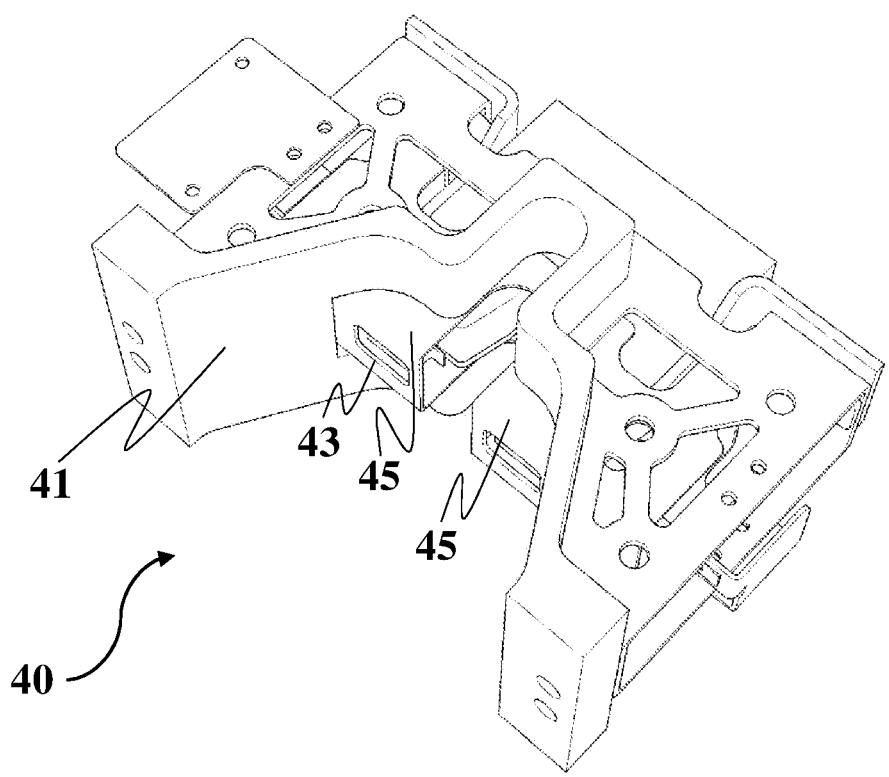
FIG. 1 is a perspective view of an engagement unit, according to the present invention.
Figure 2:
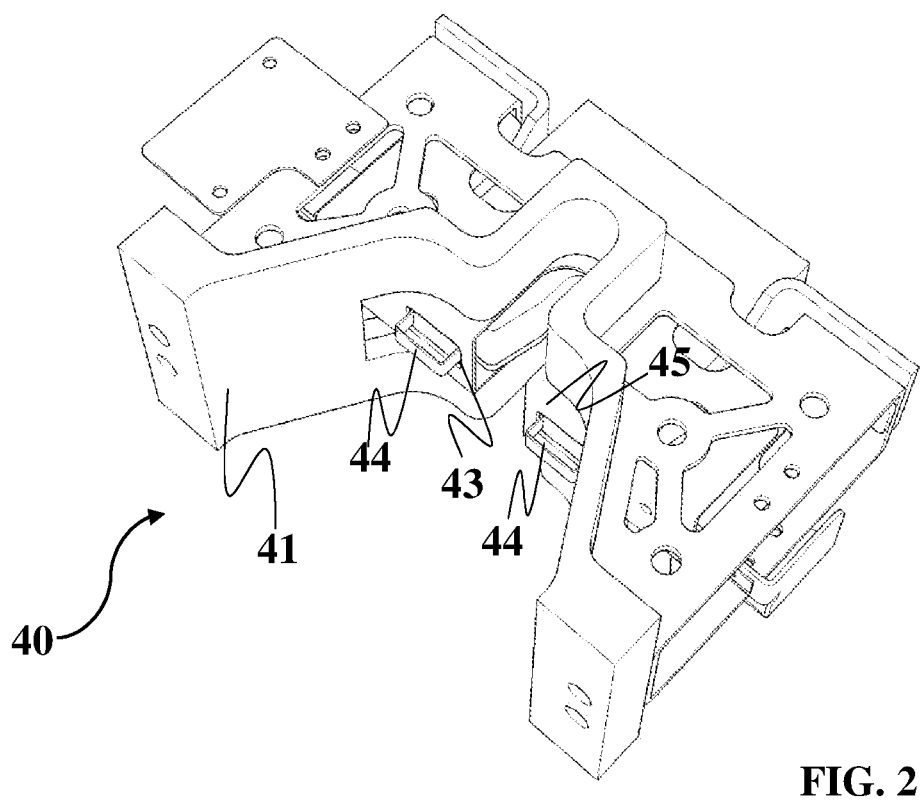
FIG. 2 is a perspective view of an engagement unit wherein a protective shield of the engagement unit is retracted, according to the present invention.
Figure 3:
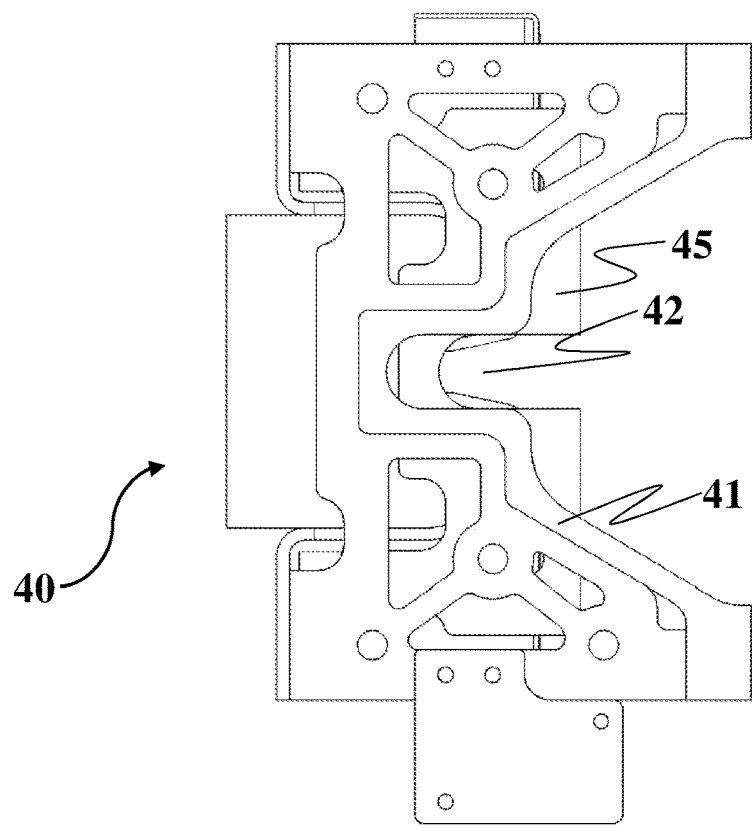
FIG. 3 is a top view of the engagement unit shown in FIG. 1.
Figure 4:
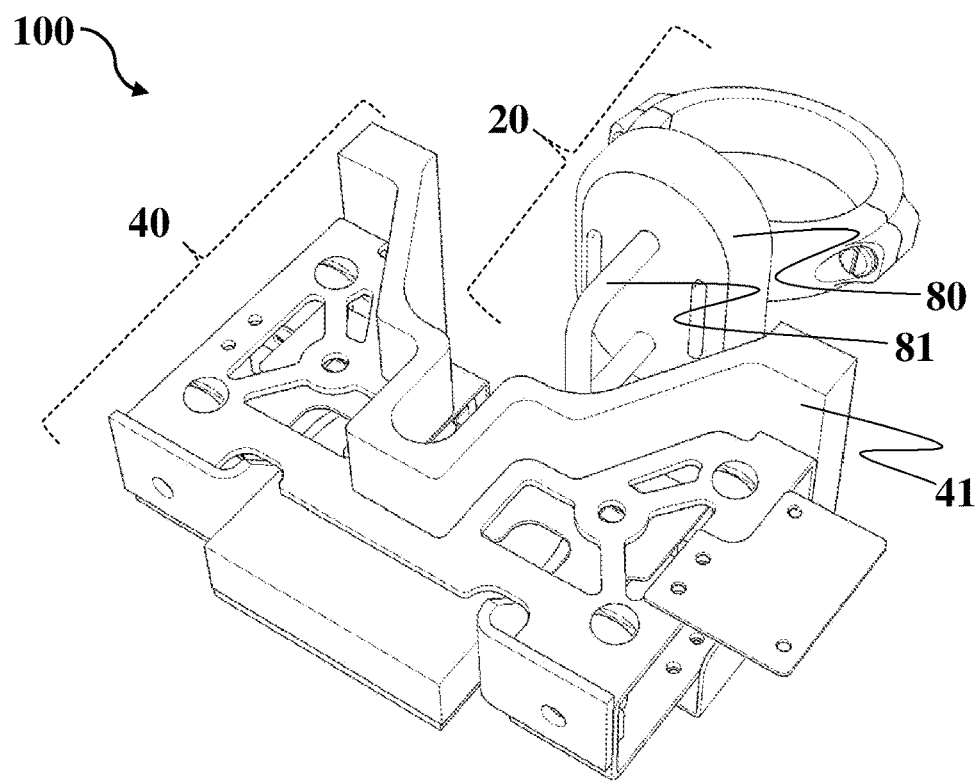
FIG. 4 is a perspective view of the docking and recharging system having the engagement unit and the attachment unit, according to the present invention.
Figure 5:
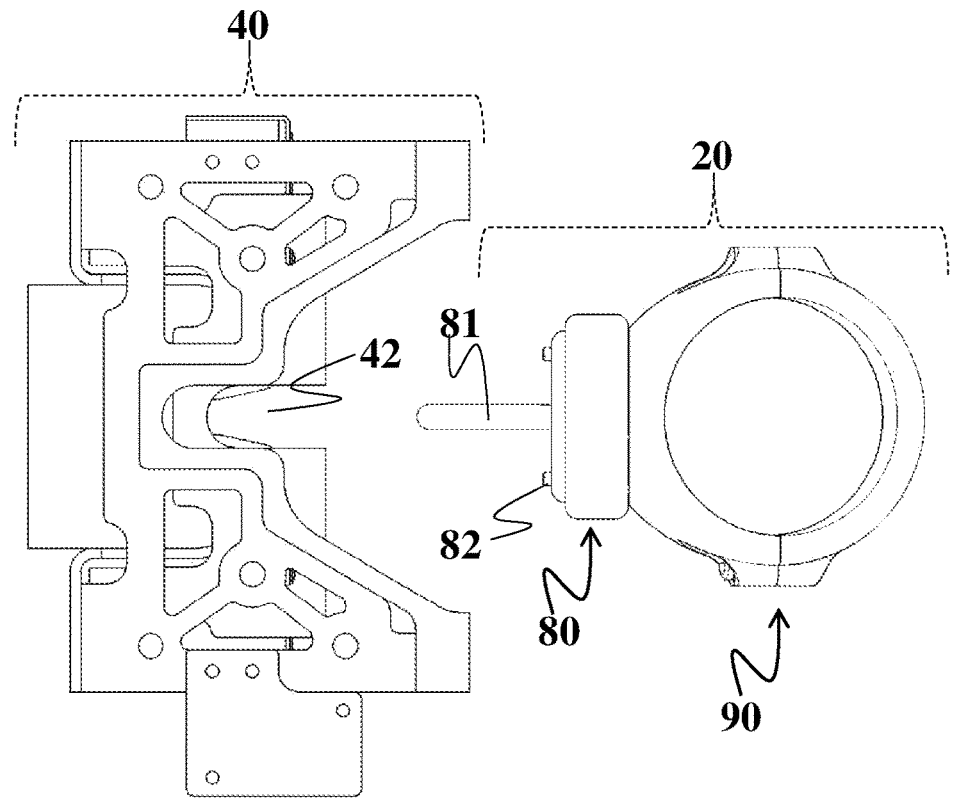
FIG. 5 is a top view of the docking and recharging system shown in FIG. 4.
Figure 6:
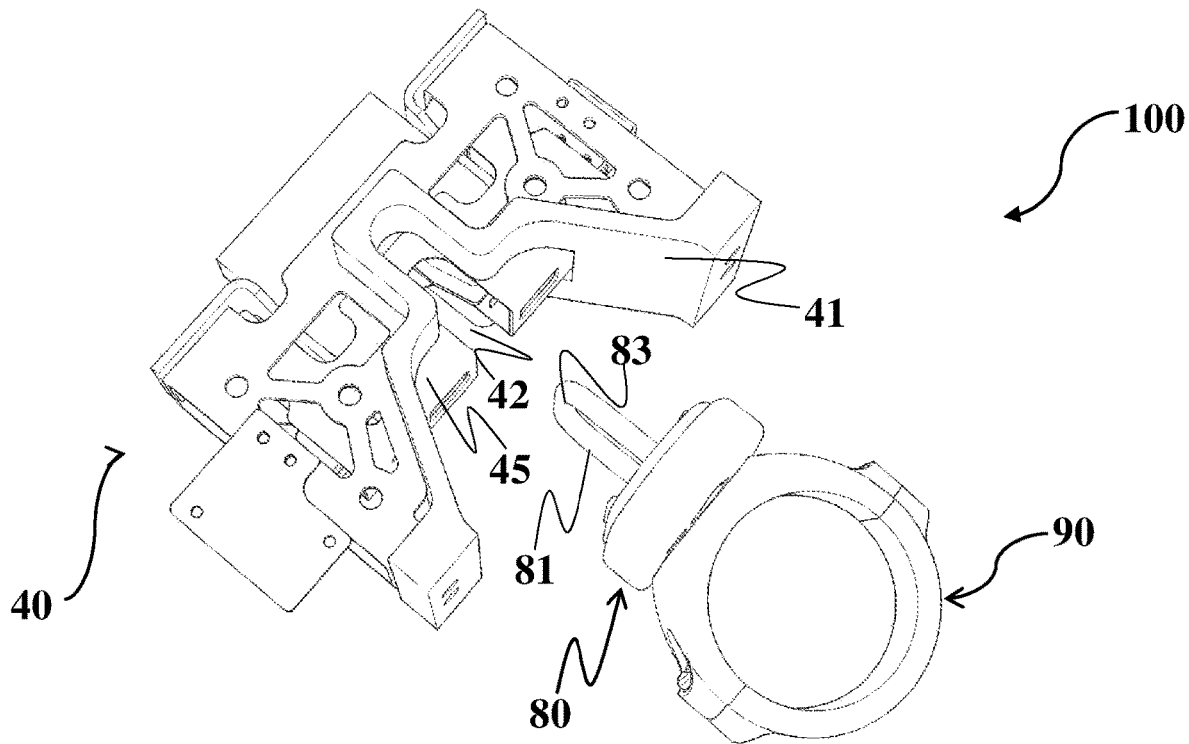
FIG. 6 is another perspective view of the docking and recharging system shown in FIG. 4.

10. Personal mobility vehicle
20. Attachment unit
   23. Connection port
24. Front clamp part
25. Rear clamp part
26. Connection hole
   27. Fastening means
   28. Flap
   29. Hole
30. Docking station
40. Engagement unit
   41. Guiding portion
42. Slot
43. Aperture
   44. Electric terminal module
   45. Protective shield
80. Main body
   81. Actuation means
   82. Electric terminal module
   83. Tip portion
90. Clamp ring
100. Docking and recharging system

DETAILED DESCRIPTION OF THE EMBODIMENTS

Referring to the figures summarized above, the present invention proposes an engagement unit (40), an attachment unit (20) and a docking and recharging system (100) for a battery assisted personal mobility vehicle (10).

According to the present invention, the engagement unit (40) is in co-operation with the separate attachment unit (20) in the docking and recharging system (100) for the power assisted personal mobility vehicle (10) having the battery that accumulates electronic power to be supplied to an electric motor for transformation of electric energy into mechanical energy. According to the present invention, said engagement unit (40) comprises; an electric terminal module (44) configured to establish an electrical connection with a corresponding electric terminal module (82) provided at the attachment unit (20); a locking means configured to secure the attachment unit (20) when the attachment unit (20) is in a lockable position and an actuation means (81) of the attachment unit (20) is fully engaged within the engagement unit (40); and a control module configured to receive an identification signal from an identification means provided in the attachment unit (20).

Said locking means can comprise a mechanical lock, an electronic lock, a computerized lock or a combination of any of these. For example, a computerized lock is able to in communication with the control module. Locking of the personal mobility vehicles (10) may be achieved in any suitable manner, and the respective cooperating parts of the attachment unit (20) and the engagement unit (40) may be configured in any manner provide to a secure, locked connection there between. The locking means may be wirelessly activated or deactivated via the control module and unlocking of the parts may be controlled electronically. For example, the control module can have a communication module so that the locking means is controlled remotely via GSM/GPRS/LTE, TCP/IP (Transmission Control Protocol/Internet Protocol) or RFID signals. One example of the lock means includes a hook-shaped locking that can be triggered and rotated around a rotation axis so that the actuation means (81) of the attachment unit (20) is kept firmly being prevented from moving backward. For example, the locking means in communication with the control module prevents the personal mobility vehicle (10) from moving and send off alarm signals to an operator of the user or a predetermined central unit if detecting unauthorized usage of the personal mobility vehicle (10).

When the user wants to take the personal mobility vehicle (10), the control module allows the unlocking of the attachment unit (20) by sending signal to the locking means. In some embodiments, the locking means is actuated to disengage by establishing a secure pairing between the engagement unit (40) and the user's remote device (i.e., cell phone, tablet or the like). Once the devices are paired, the user sends an unlock call to the control module. On receiving the unlock call, the control module checks the signal is valid, if it is valid then the locking means is actuated and the user is able to remove the actuation means (81) from a slot (42) of the engagement unit (40).

In an alternative embodiment, if the user does not interact within a specific time period the docking and recharging system (100) may again lock the personal mobility vehicle (10). When the personal mobility vehicle (10) is not parked, the engagement unit (40) can be in standby mode until the identification signal is sensed by the control module. Once inserting the personal mobility vehicle (10) has been performed, the system is locked and depending on the control module recharging of the battery of the vehicle (10) is also carried out.

According to the present invention, the attachment unit (20) for co-operation with the interrelated engagement unit (40) comprises: the electric terminal module (82) configured to establish an electrical connection with the corresponding electric terminal module (44) provided at the engagement unit (40); an actuation means (81) arranged to engage with the engagement unit (40); and an identification means arranged to be in communication with the control module of the engagement unit (40) wherein said attachment unit (20) is attachable to the battery powered personal mobility vehicle (10). Said engagement unit and the attachment unit (20) can be realized as a port and an adaptor, respectively; wherein said port interacts with the adaptor and is arranged to communicate with each other.

Figure 9:
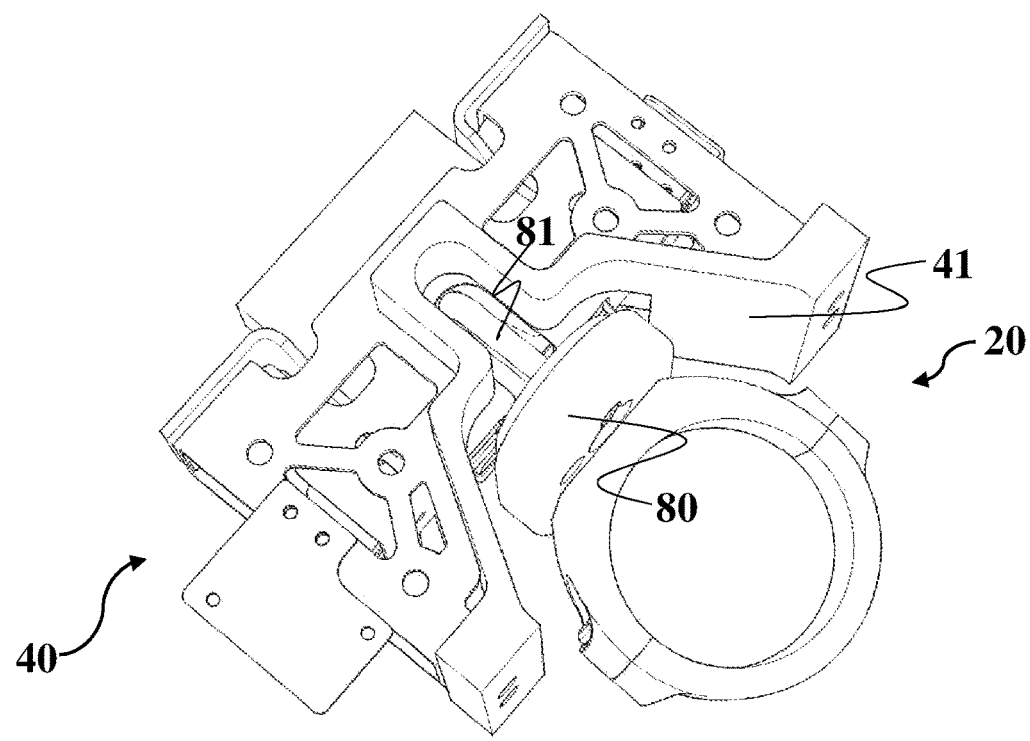
FIG. 9 a perspective view of the docking and recharging system wherein the attachment unit is pushed in such a way that the electrical contacts of the attachment unit and the engagement units are in contact.
Figure 10:
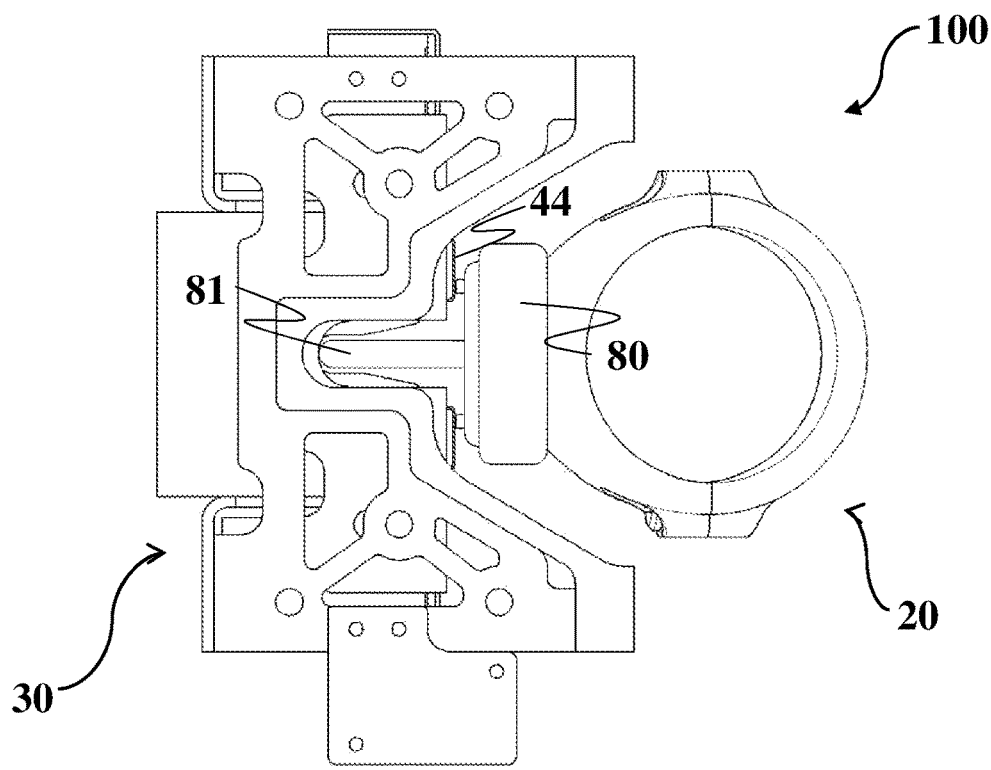
FIG. 10 is a top view of the docking and recharging system shown in FIG. 9.

Referring to the FIGS. 9 and 10, the electrical connection that allows the personal mobility vehicle (10) battery to be recharged is established by means of the contact between the electrical terminal modules (82, 44). Recharging may be carried out until the vehicle (10) is completely recharged, in some embodiments the vehicle (10) may be only partially recharged. When the user wants to dock and recharge the personal mobility vehicle (10), he/she drives the personal mobility vehicle (10) towards a slot (42) in a guiding portion (41) of the engagement unit until a protective shield (45) is retracted. As can be clearly seen in FIG. 1, the engagement unit (40) has the protective shield (45) for covering the electric terminal module (82) thereof, wherein this protective shield (45) is arranged to be pushed by a flat tip portion (83) of the actuation means (81). Said protective shield (45) can be formed as a casing having substantially U-shaped cross-section that covers the electric terminal module (44) thereof. Referring to the figures, said electric terminal modules (82, 44) can have more than one connection portions, preferably two similar portions that are enough rigid to be pressed.

In a possible embodiment, the protective shield (45) is spring-biased and can be moved by the movement of the actuation means (81) in the slot (42) of the engagement unit (40). Each electric terminal modules (44, 82) has a conductive layer that is arranged to contact one of the charging terminals establishing a voltage difference that is transmitted to the battery of the personal mobility vehicle (10). Said protective shield (45) has apertures (43) shaped and dimensioned with respect to the corresponding electric terminal modules (44) of the engagement unit (40) such that electric terminal module (44) go out through the respective apertures (43). Said protective shield (45) allows recharging to be carried out simply and safely, and restricting access to the electric terminal module (44). In a preferred embodiment, two apertures (43) are provided with a rectangular shaped cross-section.

Figure 7:
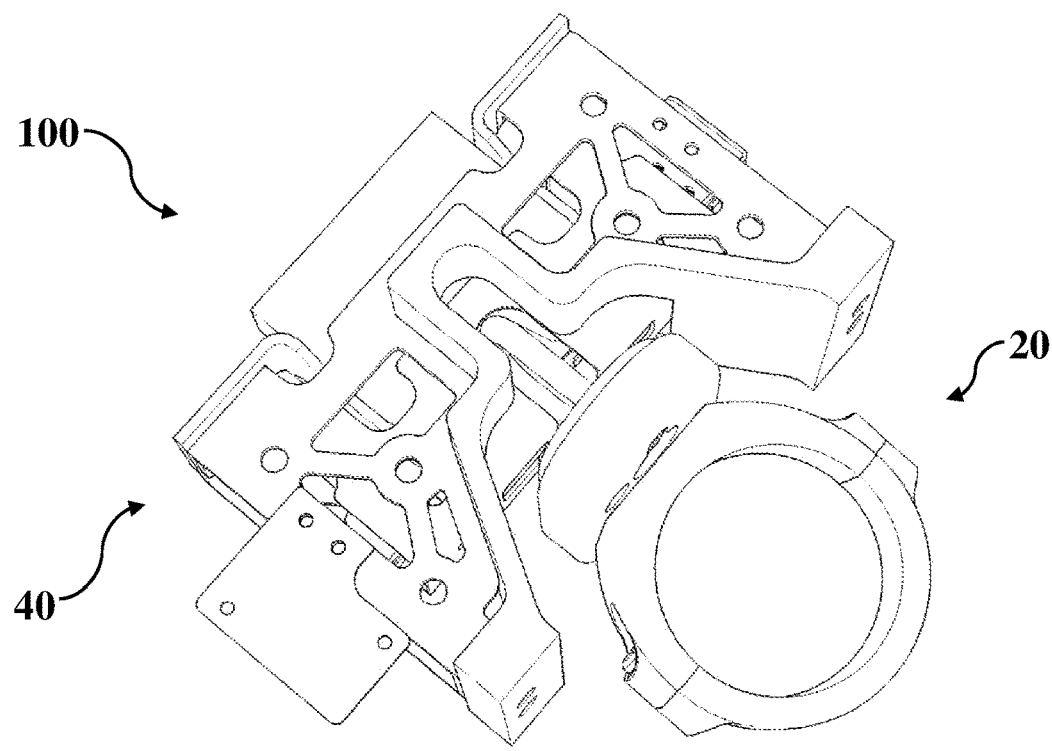
FIG. 7 is a perspective view of the docking and recharging system in which an actuation means of the attachment unit is in a slot of the engagement unit before of the protective shield is pushed relative to the electric terminal module of the engagement unit, according to the present invention.
Figure 8:
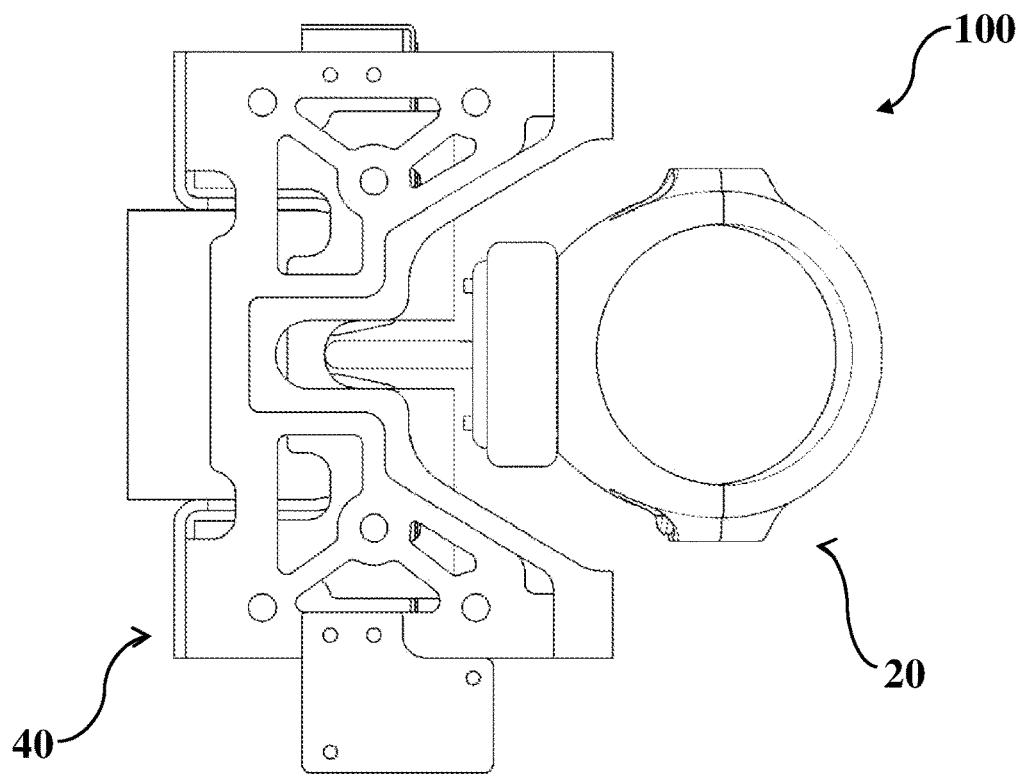
FIG. 8 is a top view of the docking and recharging system shown in FIG. 7.

FIGS. 7 and 8 show that the position of the actuation means (81) of the attachment unit (20) before fully engaged within the slot (42) of the engagement unit (40) wherein a tip portion (83) of the actuation means (81) is contacted the protective shield (45) for covering the electric terminal module (82). In that state, when the attachment unit (20) is pushed more relative to the electric terminal module (44) of the engagement unit (40), said actuation means (81) is brought into the lockable position within the slot (42) of the engagement unit (40) and the electrical connection is established depending on the control module as shown in FIG. 10. Said slot (42) is mainly formed as a passage or hole with a predetermined width.

Figure 11:
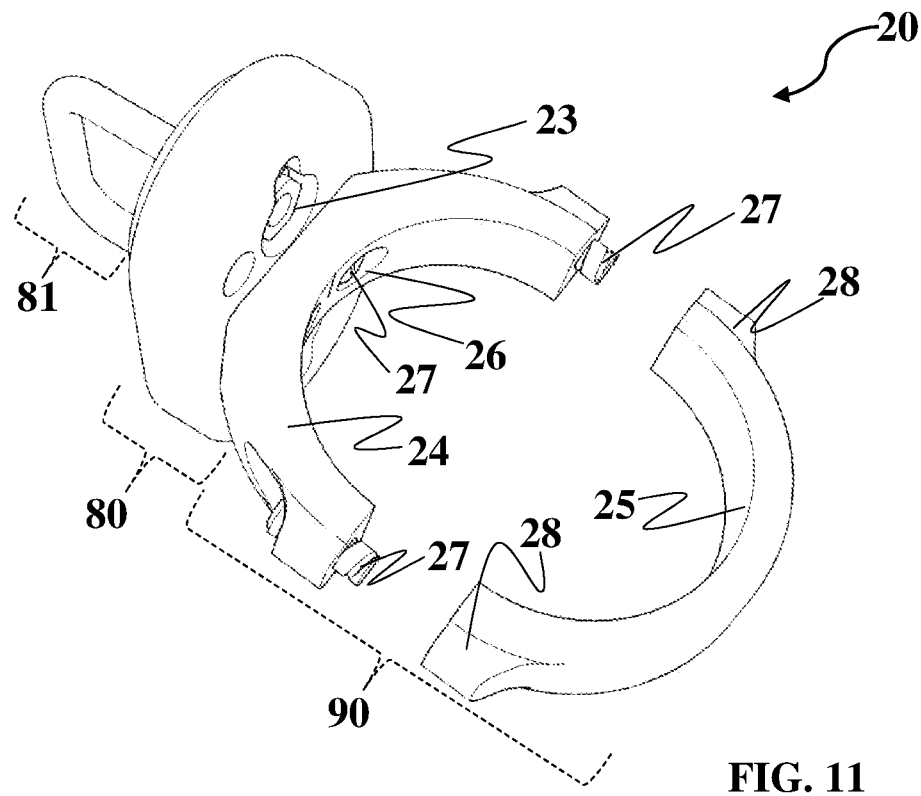
FIG. 11 is a perspective view of the attachment unit showing a two part form of a lock ring according to the present invention.
Figure 12:
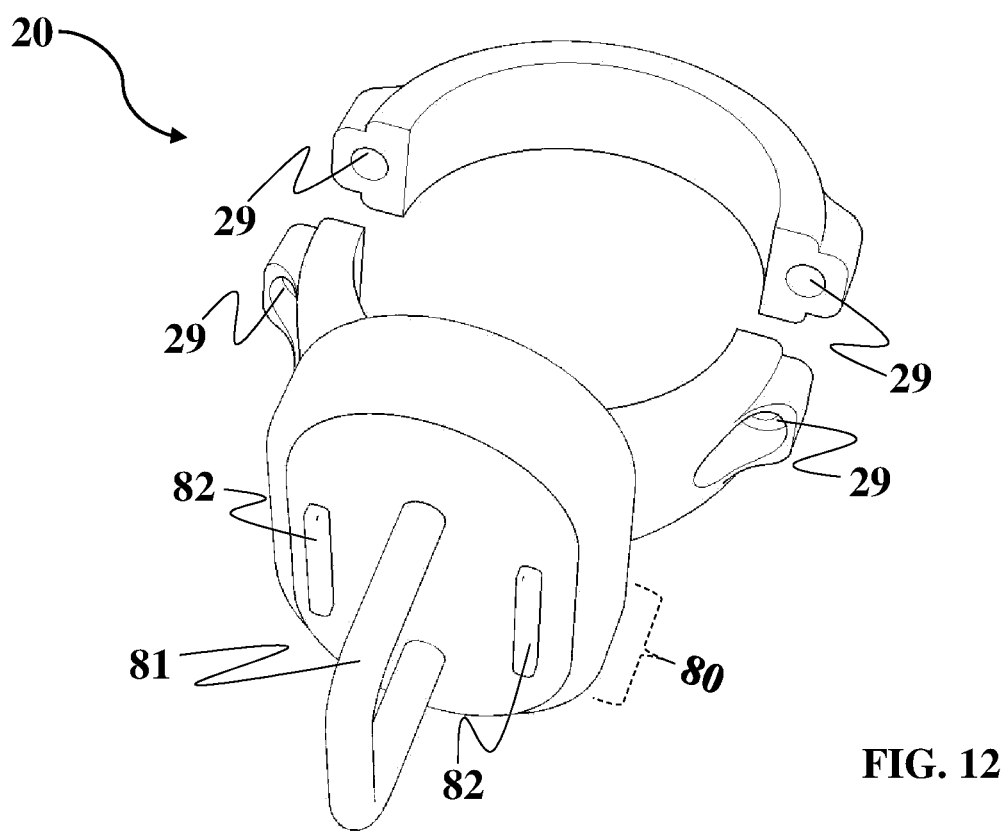
FIG. 12 is another perspective view of the attachment unit shown in FIG. 11.
Figure 13:
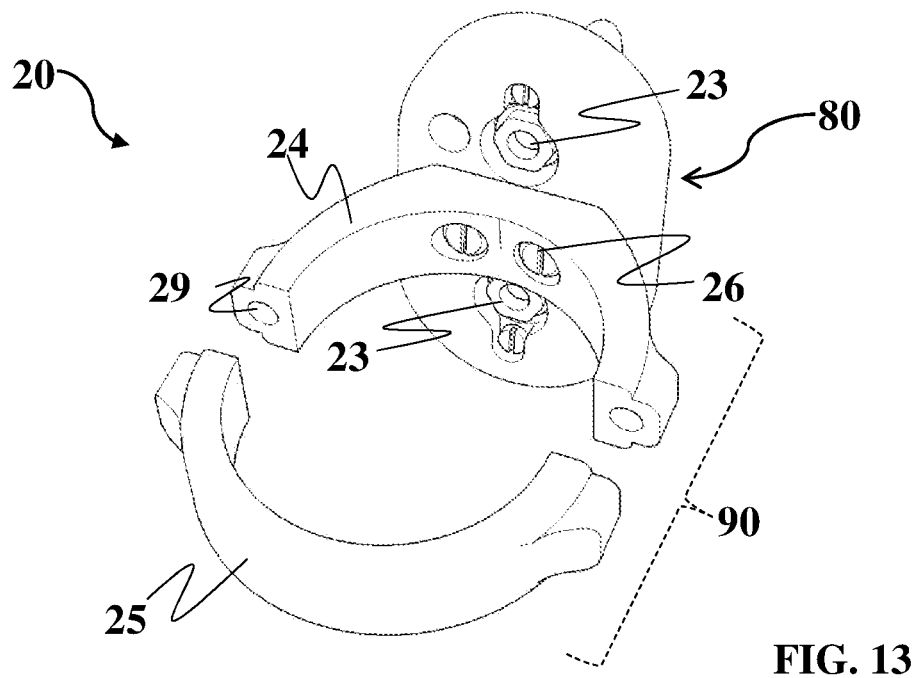
FIG. 13 is a rear perspective view of the attachment unit shown in FIG. 11.
Figure 18:
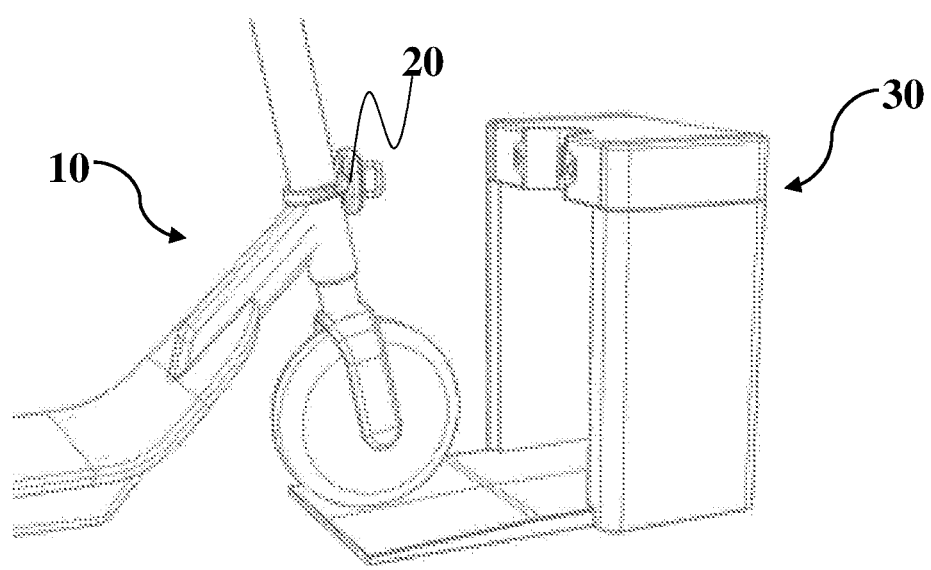
FIG. 18 is schematic view of the docking and recharging system wherein the attachment unit is installed to a lightweight electric vehicle to engage with a docking station having the engagement unit according to the present invention.
Figure 19:
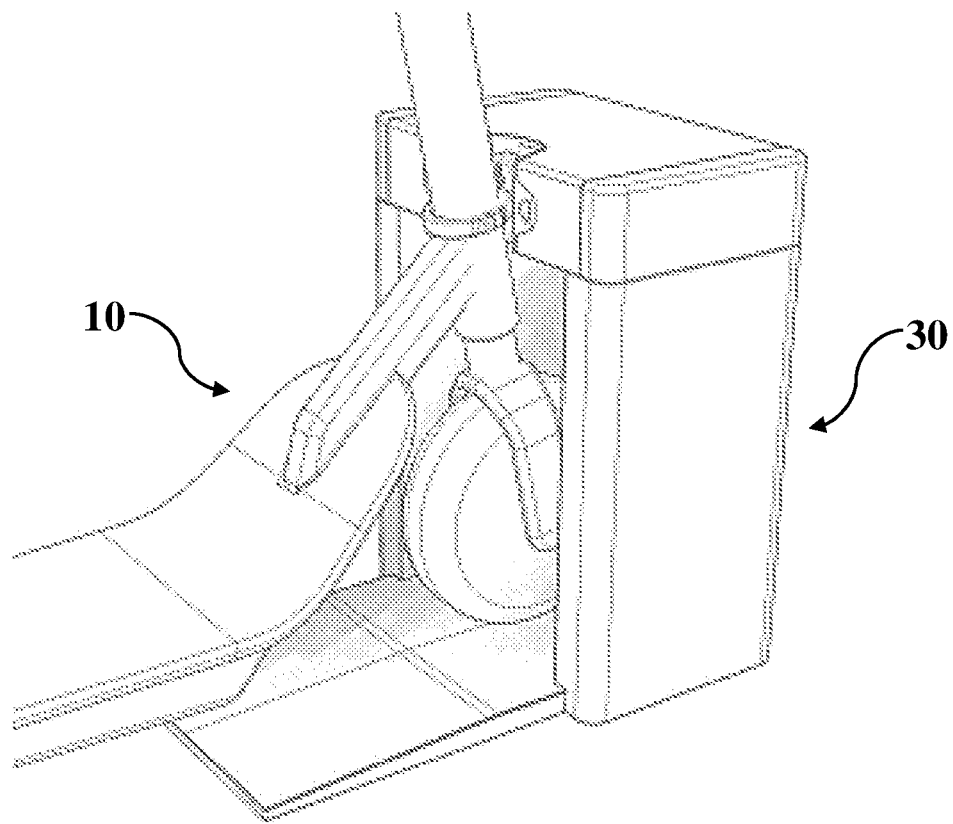
FIG. 19 is schematic view of the docking and recharging system wherein the lightweight electric vehicle is in park position according to the present invention.
Figure 20:
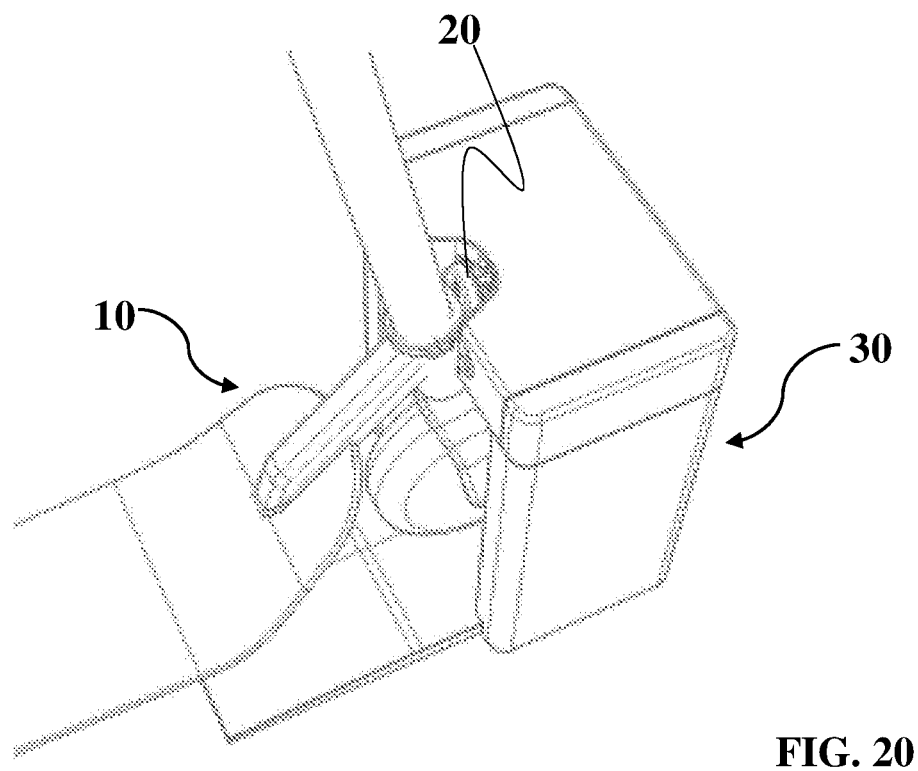
FIG. 20 is an upper schematic view of the docking and recharging system shown in FIG. 19.

Referring to the FIG. 11, the attachment unit (20) has preferably a main body (80) associated with the actuation means (81) and a clamp ring (90) wherein said actuation means (81) is shaped and dimensioned with respect to the slot (42) in the engagement unit (40). Said clamp ring (90) is attached to the main body (80) and is arranged to be installed on a portion of the personal mobility vehicle (10) when in use. FIGS. 18-20 show that the position and the location of the clamp ring (90) attached to the personal mobility vehicle (10). In a prefer embodiment, the clamp ring (90) is removable integrated to a bar of the personal mobility vehicle (10) such that different type of vehicles (10) can be also used. Furthermore, in one embodiment of the invention, new personal mobility devices can be added to the system easily after recognized.

In particularly, the main body (80) is provided with the electric terminal module (82) arranged to be in contact with the respective electric terminal module (44) provided in the engagement unit (40) to apply electric voltage thereto by contact. In a preferred embodiment, the actuation means (81) has a U-shaped cross-section and is formed as an extension of the main body (80). Furthermore, the attachment unit (20) has at least one connection port (23) for connection with a transmitting means for transmitting electricity from a power source in a communication with the engagement unit (40) to the battery of the personal mobility vehicle (10). The connection port (23) is formed as a female part that matches with a male part of the transmitting means. Again referring to the FIG. 11, the clamp ring (90) is in a two-part form with a front clamp part (24) and a rear clamp part (25) wherein the front and rear clamp parts (24, 25) of the clamp ring (90) are provided at their ends with outwardly extending flaps (28) being provided with holes (29) for accommodating fastening means (27). Said front clamp (24) and the rear clap (25) can be formed as a first lock ring and a second lock ring which form a ring-shaped clamp ring (90) wherein said first lock ring and the second lock ring can be identical. The front clamp part (24) is provided with at least one connection hole (26) for accommodating fastening means (27) to attach the main body (80) of the attachment unit (20). Said fastening means (27) can be formed as a screw, bolt or the like with helical ridge. Since the clamp ring (90) is formed as a two-part shaped, said attachment unit (20) can be easily mechanically attached and/or removed to the personal mobility vehicle (10). With this arrangement, different type of scooter or the like vehicles can be integrated and used in the docking and recharging system (100). Furthermore, this configuration advantageously enables usage of different sized and shaped electric vehicles to be used.

Figure 14:
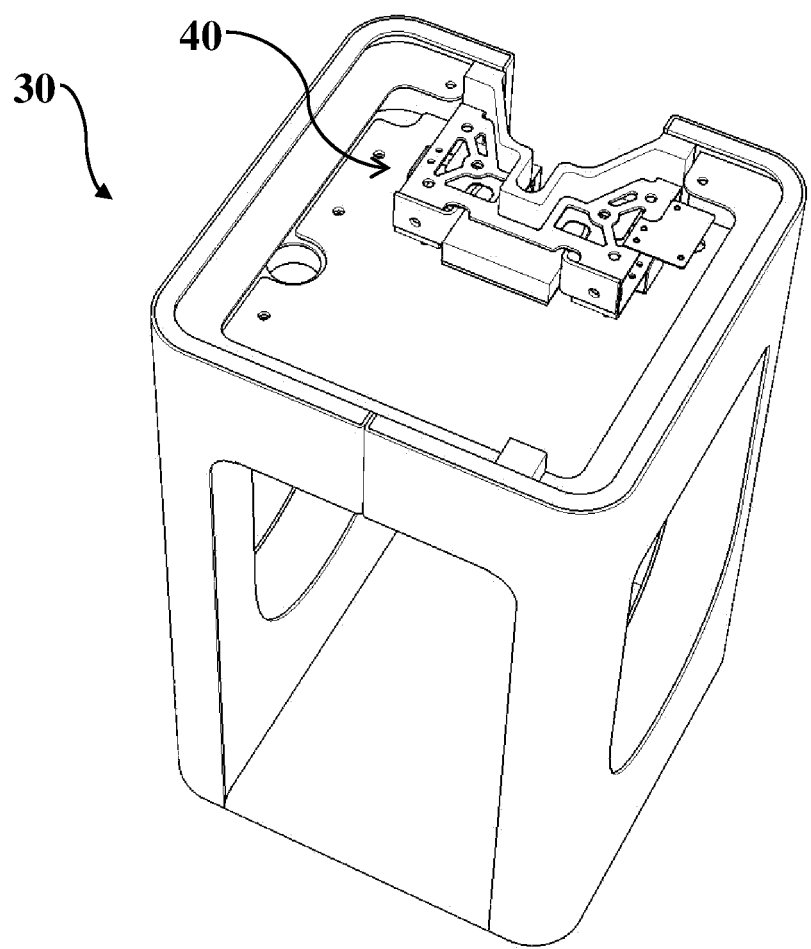
FIG. 14 is a perspective view of the docking station of the docking and recharging system according to another embodiment of present invention.
Figure 15:
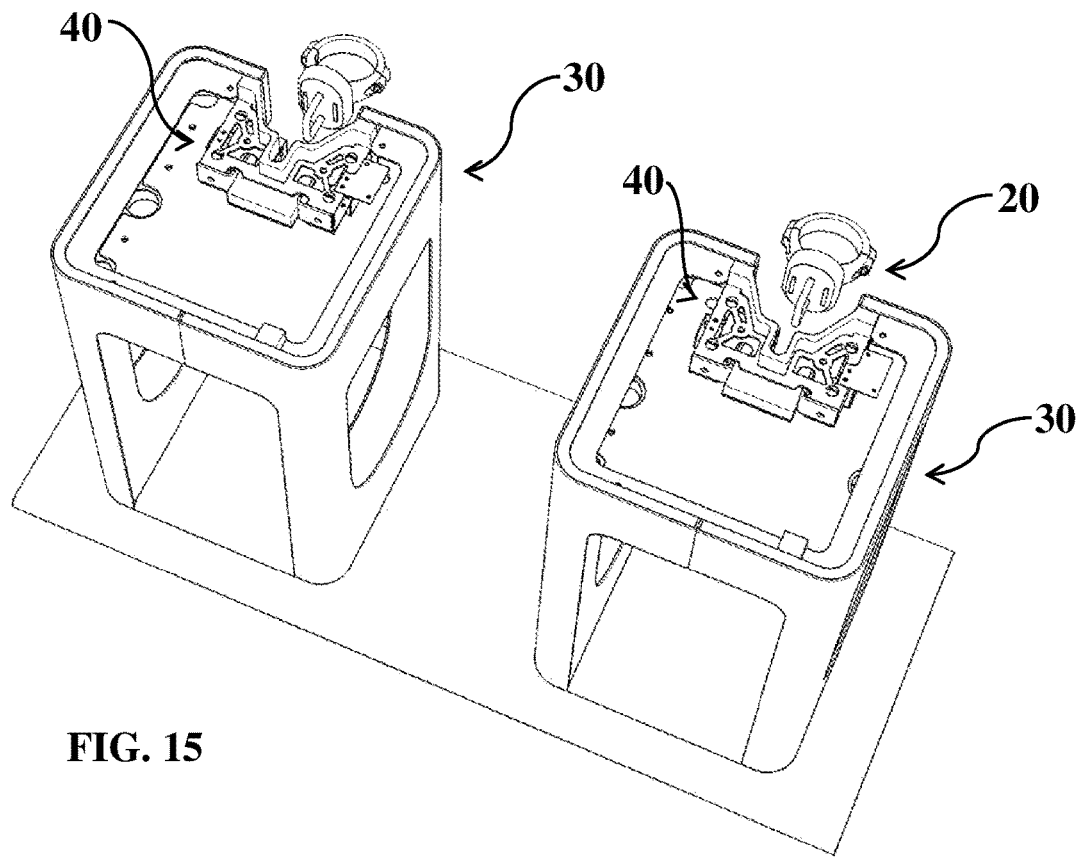
FIG. 15 is a perspective view of two docking stations of the docking and recharging system according to the present invention.
Figure 16:
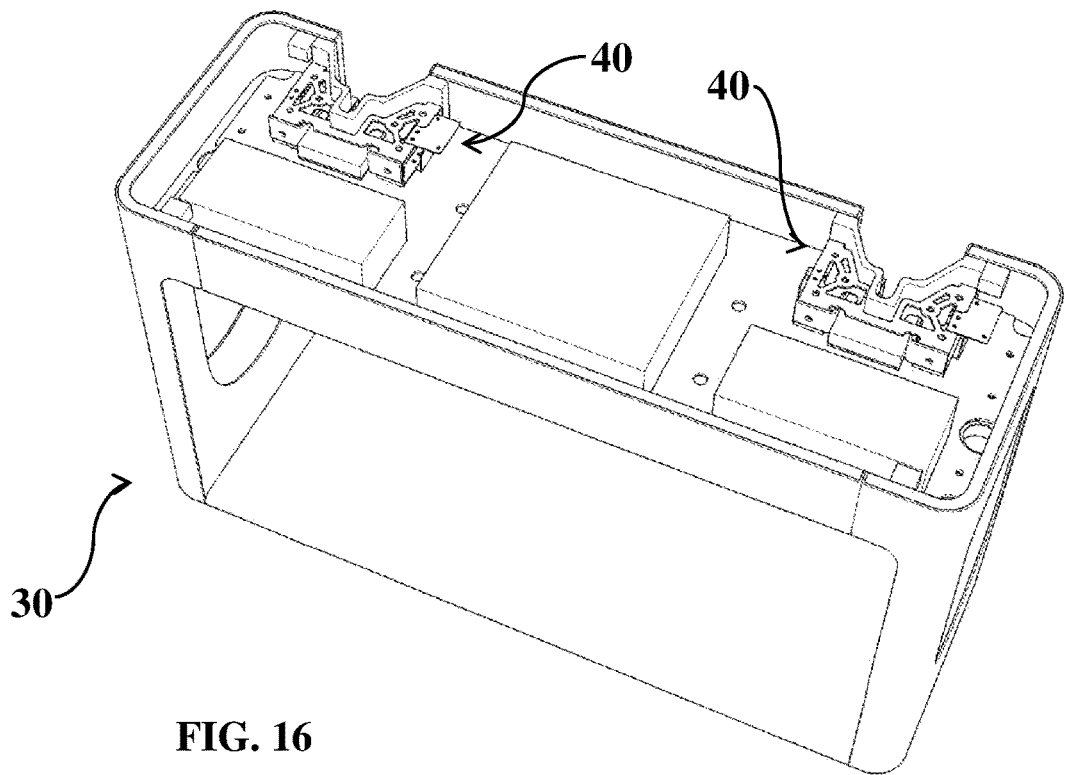
FIG. 16 is a perspective view of a dual type docking station of the docking and recharging system in which the two engagement unit are installed, according to another embodiment of present invention.
Figure 17:
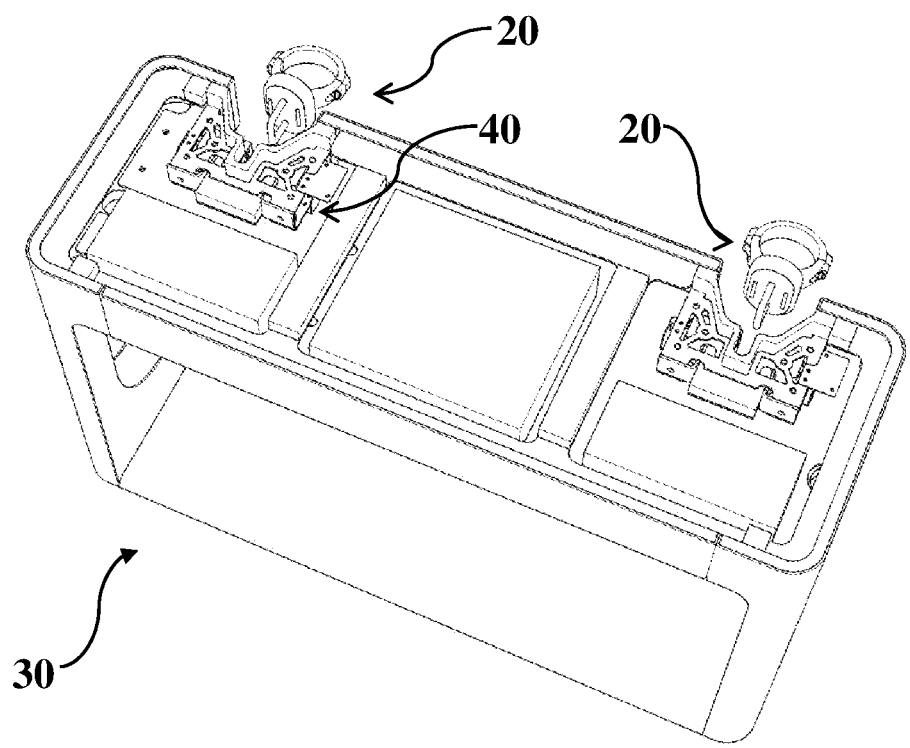
FIG. 17 is a perspective view of the docking station with two attachment units shown in FIG. 16.

The docking and recharging system (100) generally comprises the removable attachment unit (20) and the engagement unit (40) wherein said attachment unit is arranged to be installed on the personal mobility vehicle (10) and the engagement unit (40) is preferably arranged to be installed on a docking station (30) as shown in FIGS. 15-17. Referring to the FIG. 14, at least one docking station (30) to which the personal mobility vehicle (10) is arranged to connect for docking and/or recharging, comprises the engagement unit (40) which is arranged to cooperate with the attachment unit (20) of the personal mobility vehicle (10) in use to both lock the personal mobility vehicle (10) and docking station (30) together and establish the electrical connection to permit recharging of the battery of the personal mobility vehicle (10).

In an alternative embodiments, the docking and recharging system (100) can comprise more than one separate docking stations (30) each having separate engagement unit (40) as shown in FIG. 16. A docking station (30) in such systems can be called as a dual port charging station. When the user wants to drive the personal mobility vehicle (10) for engagement with the docking station (30), a guiding portion (41) provided at the engagement unit (40) can help to direct the actuation means (81) via the slot (42) of the engagement unit (40). Said guiding portion (41) extends outwardly for guiding the actuation means (81) of the attachment unit (20) into the lockable position. Each docking station (30) can comprises an electrical power source or arranged to use public electricity supply. The control module of the docking and recharging system (100) is configured to allow a remote control from a remote device by performing data information interaction with the attachment unit (20) and the engagement unit (40). The location of the control module can vary but in a preferred embodiment the control module is provided in the engagement unit (40).

The identification signal from the identification means provided in the attachment unit (20) is sensed by the control device to do a comparison with at least one compatibility parameter and thus a decision concerning the compatibility for operation of the engagement unit (40). For instance, the identification signal can enable the control device to commence recharging. The system can be provided with a server to obtain authorization to lock and recharge, said server being configured to keep data of the personal mobility vehicle (10) in the system. The control module can communicate with this server, for example by radio, wireless or by other means. In one embodiment, the control module can communicate with the server to obtain authorization to release the vehicle (10) from the engagement unit (40). The server may be located at one place or may be distributed at multiple locations. All the vehicle can be identified by a central unit, since these vehicles (10) communicate with said central unit by means of the communication interfaces. The user can get the authorization via this central unit.

The control module is adapted to determine whether the personal mobility vehicle (10) is locked onto the docking station (30) and to enable a recharging circuit to operate to charge the battery only if the personal mobility vehicle (10) is locked onto the docking station (30). In one embodiment shown in FIG. 15, the docking station (30) may be arranged to dock only one vehicle at a time, another embodiment of the docking station (30) shown in FIGS. 16 and 17 is arranged such that a plurality of vehicles (10) may be docked thereto simultaneously. The docking station may (30) be a standalone docking station or part of a docking structure. A plurality of sets of engagement units (40) may then be provided on different sides of the post for receiving a plurality of vehicles.

Said control module configured to receive the identification signal from an identification means provided in the attachment unit (20). The identification means can include an electronic identification code, which is readable or detectable by the control module. The identification signal can have different forms, such as an electronic address, a machine readable number or code, a physical trait or parameter, or a combination of any of these. The identification means is preferably formed as a RFID tag or Bluetooth beacon or any unique identifier device. Said Bluetooth beacon can be small Bluetooth radio transmitter, powered by batteries or any other battery unit.

Said identification signal can correspond to an identification parameter, such as for example an access or PIN code, a serial number and/or a model ID, if required with manufacturer ID. Alternatively or additionally, the identification signal can correspond to a functional ID regarding the functionality of the electric component of the vehicle (10). When the control device detects signal from the identification means, the control device checks the signal corresponds to the compatibility parameter, if the signal matches with the predetermined value, the control device sends a signal to the engagement unit (40) to commence powering from a power supply system attached to the docking and recharging system (100).

According to the present invention, the engagement unit (40) and the attachment unit (20) are formed as separate apparatus but they are configured to complement each other and work together. The engagement unit (40), the attachment unit (20) and the docking station (30) are formed as rigid, which provides a much simpler and safer system, as the user is not required to carry out any action other than presenting the vehicle (10) to the docking station (30) to begin recharging. In a preferred embodiment, the personal mobility vehicle (10) is a scooter or an electric bicycle having a handlebar assembly, a support assembly, and a pivot assembly. The attachment unit (20) is preferably attached to a portion of the pivot assembly of the scooter or electric bicycle. The attachment unit (20) is arranged to be in co-operation with the all different type of embodiments the engagement unit (40) disclosed above.

What is claimed is:

1. An engagement unit for co-operation with an attachment unit, wherein the attachment unit is attachable to a battery powered personal mobility vehicle for docking and recharging, the engagement unit comprises;
   a first electric terminal module configured to establish an electrical connection with a second electric terminal module provided at the attachment unit;
   a locking means configured to secure the attachment unit when the attachment unit is in a lockable position and a U-shaped actuation means of the attachment unit is fully engaged within the engagement unit;
   a control module configured to receive an identification signal from an identification means provided in the attachment unit,
   a guiding portion extending outwardly for guiding the U-shaped actuation means of the attachment unit into the lockable position, wherein the U-shaped actuation means is formed as an extension of a main body; and
   a slot having a predetermined width in the guiding portion, wherein the slot is shaped and dimensioned with respect to the U-shaped actuation means of the attachment unit, and
   wherein the engagement unit has a protective shield for covering the second electric terminal module of the engagement unit wherein the protective shield is arranged to be pushed by a flat tip portion of the U-shaped actuation means.

2. An engagement unit for co-operation with an attachment unit, wherein the attachment unit is attachable to a battery powered personal mobility vehicle for docking and recharging, the engagement unit comprises;
   a first electric terminal module configured to establish an electrical connection with a second electric terminal module provided at the attachment unit;
   a locking means configured to secure the attachment unit when the attachment unit is in a lockable position and a U-shaped actuation means of the attachment unit is fully engaged within the engagement unit;
   a control module configured to receive an identification signal from an identification means provided in the attachment unit,
   a guiding portion extending outwardly for guiding the U-shaped actuation means of the attachment unit into the lockable position, wherein the U-shaped actuation means is formed as an extension of a main body; and
   a slot having a predetermined width in the guiding portion, wherein the slot is shaped and dimensioned with respect to the U-shaped actuation means of the attachment unit; and the second electric terminal module configured to establish the electrical connection with the first electric terminal module provided at the engagement unit;
the U-shaped actuation means arranged to engage with the engagement unit;
the identification means arranged to be in communication with the control module of the engagement unit, wherein the attachment unit is attachable to the battery powered personal mobility vehicle,
a clamp ring attached to the main body with a fastening means;
a front clamp part provided with at least one connection hole for accommodating the fastening means to attach the main body of the attachment unit; and
the main body having the U-shaped actuation means and the second electric terminal module arranged to be in contact with the first electric terminal module provided in the engagement unit, wherein the U-shaped actuation means is formed as the extension of the main body, and has a U-shaped cross-section being shaped and dimensioned with respect to the slot in the engagement unit.

3. An engagement unit for co-operation with an attachment unit, wherein the attachment unit is attachable to a battery powered personal mobility vehicle for docking and recharging, the engagement unit comprises;
a first electric terminal module configured to establish an electrical connection with a second electric terminal module provided at the attachment unit;
a locking means configured to secure the attachment unit when the attachment unit is in a lockable position and a U-shaped actuation means of the attachment unit is fully engaged within the engagement unit;
a control module configured to receive an identification signal from an identification means provided in the attachment unit,
a guiding portion extending outwardly for guiding the U-shaped actuation means of the attachment unit into the lockable position, wherein the U-shaped actuation means is formed as an extension of a main body; and
a slot having a predetermined width in the guiding portion, wherein the slot is shaped and dimensioned with respect to the U-shaped actuation means of the attachment unit;
the second electric terminal module configured to establish the electrical connection with the first electric terminal module provided at the engagement unit;
the U-shaped actuation means arranged to engage with the engagement unit;
the identification means arranged to be in communication with the control module of the engagement unit, wherein the attachment unit is attachable to the battery powered personal mobility vehicle,
a clamp ring attached to the main body with a fastening means;
a front clamp part provided with at least one connection hole for accommodating the fastening means to attach the main body of the attachment unit; and
the main body having the U-shaped actuation means and the second electric terminal module arranged to be in contact with the first electric terminal module provided in the engagement unit, wherein the U-shaped actuation means is formed as the extension of the main body, and has a U-shaped cross-section being shaped and dimensioned with respect to the slot in the engagement unit, and
wherein the attachment unit comprises the clamp ring being attachable to a portion of the battery powered personal mobility vehicle when in use.

4. An engagement unit for co-operation with an attachment unit, wherein the attachment unit is attachable to a battery powered personal mobility vehicle for docking and recharging, the engagement unit comprises;
a first electric terminal module configured to establish an electrical connection with a second electric terminal module provided at the attachment unit;
a locking means configured to secure the attachment unit when the attachment unit is in a lockable position and a U-shaped actuation means of the attachment unit is fully engaged within the engagement unit;
a control module configured to receive an identification signal from an identification means provided in the attachment unit,
a guiding portion extending outwardly for guiding the U-shaped actuation means of the attachment unit into the lockable position, wherein the U-shaped actuation means is formed as an extension of a main body; and
a slot having a predetermined width in the guiding portion, wherein the slot is shaped and dimensioned with respect to the U-shaped actuation means of the attachment unit;
the second electric terminal module configured to establish the electrical connection with the first electric terminal module provided at the engagement unit;
the U-shaped actuation means arranged to engage with the engagement unit;
the identification means arranged to be in communication with the control module of the engagement unit, wherein the attachment unit is attachable to the battery powered personal mobility vehicle,
a clamp ring attached to the main body with a fastening means;
a front clamp part provided with at least one connection hole for accommodating the fastening means to attach the main body of the attachment unit; and
the main body having the U-shaped actuation means and the second electric terminal module arranged to be in contact with the first electric terminal module provided in the engagement unit, wherein the U-shaped actuation means is formed as the extension of the main body, and has a U-shaped cross-section being shaped and dimensioned with respect to the slot in the engagement unit,
wherein the attachment unit comprises the clamp ring being attachable to a portion of the battery powered personal mobility vehicle when in use, and
wherein the main body is provided with the second electric terminal module arranged to be in contact with the first electric terminal module provided at the engagement unit to apply an electric voltage to the first electric terminal module by contact.

5. An engagement unit for co-operation with an attachment unit, wherein the attachment unit is attachable to a battery powered personal mobility vehicle for docking and recharging, the engagement unit comprises;
a first electric terminal module configured to establish an electrical connection with a second electric terminal module provided at the attachment unit;
a locking means configured to secure the attachment unit when the attachment unit is in a lockable position and a U-shaped actuation means of the attachment unit is fully engaged within the engagement unit;

a control module configured to receive an identification signal from an identification means provided in the attachment unit, a guiding portion extending outwardly for guiding the U-shaped actuation means of the attachment unit into the lockable position, wherein the U-shaped actuation means is formed as an extension of a main body; and a slot having a predetermined width in the guiding portion, wherein the slot is shaped and dimensioned with respect to the U-shaped actuation means of the attachment unit;

the second electric terminal module configured to establish the electrical connection with the first electric terminal module provided at the engagement unit;

the U-shaped actuation means arranged to engage with the engagement unit;

the identification means arranged to be in communication with the control module of the engagement unit, wherein the attachment unit is attachable to the battery powered personal mobility vehicle, a clamp ring attached to the main body with a fastening means;

a front clamp part provided with at least one connection hole for accommodating the fastening means to attach the main body of the attachment unit; and the main body having the U-shaped actuation means and the second electric terminal module arranged to be in contact with the first electric terminal module provided in the engagement unit, wherein the U-shaped actuation means is formed as the extension of the main body, and has a U-shaped cross-section being shaped and dimensioned with respect to the slot in the engagement unit, wherein the attachment unit comprises the clamp ring being attachable to a portion of the battery powered personal mobility vehicle when in use, and wherein the clamp ring is in a two-part form with a front clamp part and a rear clamp part, wherein the front clamp part and the rear clamp part of the clamp ring are provided at ends of the front clamp part and the rear clamp part with outwardly extending flaps being provided with holes for accommodating the fastening means.

6. An engagement unit for co-operation with an attachment unit, wherein the attachment unit is attachable to a battery powered personal mobility vehicle for docking and recharging, the engagement unit comprises;

a first electric terminal module configured to establish an electrical connection with a second electric terminal module provided at the attachment unit;

a locking means configured to secure the attachment unit when the attachment unit is in a lockable position and a U-shaped actuation means of the attachment unit is fully engaged within the engagement unit;

a control module configured to receive an identification signal from an identification means provided in the attachment unit, a guiding portion extending outwardly for guiding the U-shaped actuation means of the attachment unit into the lockable position, wherein the U-shaped actuation means is formed as an extension of a main body; and a slot having a predetermined width in the guiding portion, wherein the slot is shaped and dimensioned with respect to the U-shaped actuation means of the attachment unit;

the second electric terminal module configured to establish the electrical connection with the first electric terminal module provided at the engagement unit;

the U-shaped actuation means arranged to engage with the engagement unit;

the identification means arranged to be in communication with the control module of the engagement unit, wherein the attachment unit is attachable to the battery powered personal mobility vehicle, a clamp ring attached to the main body with a fastening means;

a front clamp part provided with at least one connection hole for accommodating the fastening means to attach the main body of the attachment unit; and the main body having the U-shaped actuation means and the second electric terminal module arranged to be in contact with the first electric terminal module provided in the engagement unit, wherein the U-shaped actuation means is formed as the extension of the main body, and has a U-shaped cross-section being shaped and dimensioned with respect to the slot in the engagement unit, wherein the attachment unit comprises the clamp ring being attachable to a portion of the battery powered personal mobility vehicle when in use, wherein the clamp ring is in a two-part form with a front clamp part and a rear clamp part, wherein the front clamp part and the rear clamp part of the clamp ring are provided at ends of the front clamp part and the rear clamp part with outwardly extending flaps being provided with holes for accommodating the fastening means, and wherein the front clamp part is provided with at least one connection hole for accommodating the fastening means to attach the main body of the attachment unit.

7. A docking and recharging system for a battery powered personal mobility vehicle, comprising;

a attachment unit and an engagement unit wherein the attachment unit is attachable to a battery powered personal mobility vehicle for docking and recharging, the engagement unit comprises a first electric terminal module configured to establish an electrical connection with a second electric terminal module provided at the attachment unit;

a locking means configured to secure the attachment unit when the attachment unit is in a lockable position and a U-shaped actuation means of the attachment unit is fully engaged within the engagement unit;

a control module configured to receive an identification signal from an identification means provided in the attachment unit, a guiding portion extending outwardly for guiding the U-shaped actuation means of the attachment unit into the lockable position, wherein the U-shaped actuation means is formed as an extension of a main body; and a slot having a predetermined width in the guiding portion, wherein the slot is shaped and dimensioned with respect to the U-shaped actuation means of the attachment unit;

the attachment unit comprises:

the second electric terminal module configured to establish the electrical connection with the first electric terminal module provided at the engagement unit;

the U-shaped actuation means arranged to engage with the engagement unit;

the identification means arranged to be in communication with the control module of the engagement unit, wherein the attachment unit is attachable to the battery powered personal mobility vehicle, a clamp ring attached to the main body with a fastening means; a front clamp part provided with at least one connection hole for accommodating the fastening means to attach the main body of the attachment unit; and the main body having the U-shaped actuation means and the second electric terminal module arranged to be in contact with the first electric terminal module provided in the engagement unit, wherein the U-shaped actuation means is formed as the extension of the main body, and has a U-shaped cross-section being shaped and dimensioned with respect to the slot in the engagement unit.

8. A docking and recharging system for a battery powered personal mobility vehicle, comprising;

a attachment unit and an engagement unit wherein the attachment unit is attachable to a battery powered personal mobility vehicle for docking and recharging, the engagement unit comprises a first electric terminal module configured to establish an electrical connection with a second electric terminal module provided at the attachment unit;

a locking means configured to secure the attachment unit when the attachment unit is in a lockable position and a U-shaped actuation means of the attachment unit is fully engaged within the engagement unit;

a control module configured to receive an identification signal from an identification means provided in the attachment unit, a guiding portion extending outwardly for guiding the U-shaped actuation means of the attachment unit into the lockable position, wherein the U-shaped actuation means is formed as an extension of a main body; and a slot having a predetermined width in the guiding portion, wherein the slot is shaped and dimensioned with respect to the U-shaped actuation means of the attachment unit;

the attachment unit comprises:

the second electric terminal module configured to establish the electrical connection with the first electric terminal module provided at the engagement unit;
the U-shaped actuation means arranged to engage with the engagement unit;

the identification means arranged to be in communication with the control module of the engagement unit, wherein the attachment unit is attachable to the battery powered personal mobility vehicle, a clamp ring attached to the main body with a fastening means; a front clamp part provided with at least one connection hole for accommodating the fastening means to attach the main body of the attachment unit;

the main body having the U-shaped actuation means and the second electric terminal module arranged to be in contact with the first electric terminal module provided in the engagement unit, wherein the U-shaped actuation means is formed as the extension of the main body, and has a U-shaped cross-section being shaped and dimensioned with respect to the slot in the engagement unit; and at least one docking station wherein the battery powered personal mobility vehicle is arranged to the at least one docking station to connect for docking and recharging in use, and wherein the at least one docking station comprises the engagement unit arranged to cooperate with the attachment unit of the battery powered personal mobility vehicle in use to both lock the battery powered personal mobility vehicle and the at least one docking station together and establish the electrical connection to permit recharging of a battery of the battery powered personal mobility vehicle.

9. A docking and recharging system for a battery powered personal mobility vehicle, comprising;

a attachment unit and an engagement unit wherein the attachment unit is attachable to a battery powered personal mobility vehicle for docking and recharging, the engagement unit comprises a first electric terminal module configured to establish an electrical connection with a second electric terminal module provided at the attachment unit;

a locking means configured to secure the attachment unit when the attachment unit is in a lockable position and a U-shaped actuation means of the attachment unit is fully engaged within the engagement unit;

a control module configured to receive an identification signal from an identification means provided in the attachment unit, a guiding portion extending outwardly for guiding the U-shaped actuation means of the attachment unit into the lockable position, wherein the U-shaped actuation means is formed as an extension of a main body; and a slot having a predetermined width in the guiding portion, wherein the slot is shaped and dimensioned with respect to the U-shaped actuation means of the attachment unit;

the attachment unit comprises:

the second electric terminal module configured to establish the electrical connection with the first electric terminal module provided at the engagement unit;
the U-shaped actuation means arranged to engage with the engagement unit;

the identification means arranged to be in communication with the control module of the engagement unit, wherein the attachment unit is attachable to the battery powered personal mobility vehicle, a clamp ring attached to the main body with a fastening means; a front clamp part provided with at least one connection hole for accommodating the fastening means to attach the main body of the attachment unit;

the main body having the U-shaped actuation means and the second electric terminal module arranged to be in contact with the first electric terminal module provided in the engagement unit, wherein the U-shaped actuation means is formed as the extension of the main body, and has a U-shaped cross-section being shaped and dimensioned with respect to the slot in the engagement unit; and more than one separate docking stations, wherein each of the more than one separate docking stations have a separate engagement unit.

10. A docking and recharging system for a battery powered personal mobility vehicle, comprising;

a attachment unit and an engagement unit wherein the attachment unit is attachable to a battery powered personal mobility vehicle for docking and recharging, the engagement unit comprises a first electric terminal module configured to establish an electrical connection with a second electric terminal module provided at the attachment unit;

a locking means configured to secure the attachment unit when the attachment unit is in a lockable position and a U-shaped actuation means of the attachment unit is fully engaged within the engagement unit;
a control module configured to receive an identification signal from an identification means provided in the attachment unit,
a guiding portion extending outwardly for guiding the U-shaped actuation means of the attachment unit into the lockable position, wherein the U-shaped actuation means is formed as an extension of a main body; and
a slot having a predetermined width in the guiding portion, wherein the slot is shaped and dimensioned with respect to the U-shaped actuation means of the attachment unit;
the attachment unit comprises:
the second electric terminal module configured to establish the electrical connection with the first electric terminal module provided at the engagement unit;
the U-shaped actuation means arranged to engage with the engagement unit;
the identification means arranged to be in communication with the control module of the engagement unit, wherein the attachment unit is attachable to the battery powered personal mobility vehicle,
a clamp ring attached to the main body with a fastening means; a front clamp part provided with at least one connection hole for accommodating the fastening means to attach the main body of the attachment unit;
the main body having the U-shaped actuation means and the second electric terminal module arranged to be in contact with the first electric terminal module provided in the engagement unit, wherein the U-shaped actuation means is formed as the extension of the main body, and has a U-shaped cross-section being shaped and dimensioned with respect to the slot in the engagement unit; and
a server to obtain an authorization from a user to lock and recharge, wherein the server is configured to keep data of the battery powered personal mobility vehicle and the server is in communication with the control module, wherein the control module is configured to allow a remote control from a remote device by performing data information interaction with the server and the engagement unit.

11. A docking and recharging system for a battery powered personal mobility vehicle, comprising;
a attachment unit and
an engagement unit wherein
the attachment unit is attachable to a battery powered personal mobility vehicle for docking and recharging, the engagement unit comprises
a first electric terminal module configured to establish an electrical connection with a second electric terminal module provided at the attachment unit;
a locking means configured to secure the attachment unit when the attachment unit is in a lockable position and a U-shaped actuation means of the attachment unit is fully engaged within the engagement unit;
a control module configured to receive an identification signal from an identification means provided in the attachment unit,
a guiding portion extending outwardly for guiding the U-shaped actuation means of the attachment unit into the lockable position, wherein the U-shaped actuation means is formed as an extension of a main body; and
a slot having a predetermined width in the guiding portion, wherein the slot is shaped and dimensioned with respect to the U-shaped actuation means of the attachment unit;
the attachment unit comprises:
the second electric terminal module configured to establish the electrical connection with the first electric terminal module provided at the engagement unit;
the U-shaped actuation means arranged to engage with the engagement unit;
the identification means arranged to be in communication with the control module of the engagement unit, wherein the attachment unit is attachable to the battery powered personal mobility vehicle,
a clamp ring attached to the main body with a fastening means; a front clamp part provided with at least one connection hole for accommodating the fastening means to attach the main body of the attachment unit;
the main body having the U-shaped actuation means and the second electric terminal module arranged to be in contact with the first electric terminal module provided in the engagement unit, wherein the U-shaped actuation means is formed as the extension of the main body, and has a U-shaped cross-section being shaped and dimensioned with respect to the slot in the engagement unit, and
wherein the battery powered personal mobility vehicle is a scooter having a battery or an electric bicycle.

12. An engagement unit for co-operation with an attachment unit, wherein the attachment unit is attachable to a battery powered personal mobility vehicle for docking and recharging, the engagement unit comprises;
a first electric terminal module configured to establish an electrical connection with a second electric terminal module provided at the attachment unit;
a locking means configured to secure the attachment unit when the attachment unit is in a lockable position and a U-shaped actuation means of the attachment unit is fully engaged within the engagement unit;
a control module configured to receive an identification signal from an identification means provided in the attachment unit,
a guiding portion extending outwardly for guiding the U-shaped actuation means of the attachment unit into the lockable position, wherein the U-shaped actuation means is formed as an extension of a main body; and
a slot having a predetermined width in the guiding portion, wherein the slot is shaped and dimensioned with respect to the U-shaped actuation means of the attachment unit; and
the second electric terminal module configured to establish the electrical connection with the first electric terminal module provided at the engagement unit;
the U-shaped actuation means arranged to engage with the engagement unit;
the identification means arranged to be in communication with the control module of the engagement unit, wherein the attachment unit is attachable to the battery powered personal mobility vehicle,
a clamp ring attached to the main body with a fastening means;
a front clamp part provided with at least one connection hole for accommodating the fastening means to attach the main body of the attachment unit;
the main body having the U-shaped actuation means and the second electric terminal module arranged to be in contact with the first electric terminal module provided in the engagement unit, wherein the U-shaped actuation means is formed as the extension of the main body, and has a U-shaped cross-section being shaped and dimensioned with respect to the slot in the engagement unit, and wherein the attachment unit has at least one connection port for connection with a transmitting means for transmitting electricity from a power source associated with the engagement unit to a battery of the battery powered personal mobility vehicle.

13. An engagement unit for co-operation with an attachment unit, wherein the attachment unit is attachable to a battery powered personal mobility vehicle for docking and recharging, the engagement unit comprises;

a first electric terminal module configured to establish an electrical connection with a second electric terminal module provided at the attachment unit;

a locking means configured to secure the attachment unit when the attachment unit is in a lockable position and a U-shaped actuation means of the attachment unit is fully engaged within the engagement unit;

a control module configured to receive an identification signal from an identification means provided in the attachment unit, p1 a guiding portion extending outwardly for guiding the U-shaped actuation means of the attachment unit into the lockable position, wherein the U-shaped actuation means is formed as an extension of a main body; and a slot having a predetermined width in the guiding portion, wherein the slot is shaped and dimensioned with respect to the U-shaped actuation means of the attachment unit, wherein the engagement unit has a protective shield for covering the second electric terminal module of the engagement unit wherein the protective shield is arranged to be pushed by a flat tip portion of the U-shaped actuation means, and wherein the control module is configured to communicate with a server and the control module is configured to control the electrical connection between the first electric terminal module and the second electrical terminal module.

14. An engagement unit for co-operation with an attachment unit, wherein the attachment unit is attachable to a battery powered personal mobility vehicle for docking and recharging, the engagement unit comprises;

a first electric terminal module configured to establish an electrical connection with a second electric terminal module provided at the attachment unit;

a locking means configured to secure the attachment unit when the attachment unit is in a lockable position and a U-shaped actuation means of the attachment unit is fully engaged within the engagement unit;

a control module configured to receive an identification signal from an identification means provided in the attachment unit, a guiding portion extending outwardly for guiding the U-shaped actuation means of the attachment unit into the lockable position, wherein the U-shaped actuation means is formed as an extension of a main body; and a slot having a predetermined width in the guiding portion, wherein the slot is shaped and dimensioned with respect to the U-shaped actuation means of the attachment unit; and the second electric terminal module configured to establish the electrical connection with the first electric terminal module provided at the engagement unit;

the U-shaped actuation means arranged to engage with the engagement unit;

the identification means arranged to be in communication with the control module of the engagement unit, wherein the attachment unit is attachable to the battery powered personal mobility vehicle, a clamp ring attached to the main body with a fastening means;

a front clamp part provided with at least one connection hole for accommodating the fastening means to attach the main body of the attachment unit;

the main body having the U-shaped actuation means and the second electric terminal module arranged to be in contact with the first electric terminal module provided in the engagement unit, wherein the U-shaped actuation means is formed as the extension of the main body, and has a U-shaped cross-section being shaped and dimensioned with respect to the slot in the engagement unit, and wherein the engagement unit has a protective shield for covering the second electric terminal module, wherein the protective shield is arranged to be pushed by a flat tip portion of the U- shaped actuation means.

15. An engagement unit for co-operation with an attachment unit, wherein the attachment unit is attachable to a battery powered personal mobility vehicle for docking and recharging, the engagement unit comprises;

a first electric terminal module configured to establish an electrical connection with a second electric terminal module provided at the attachment unit;

a locking means configured to secure the attachment unit when the attachment unit is in a lockable position and a U-shaped actuation means of the attachment unit is fully engaged within the engagement unit;

a control module configured to receive an identification signal from an identification means provided in the attachment unit, a guiding portion extending outwardly for guiding the U-shaped actuation means of the attachment unit into the lockable position, wherein the U-shaped actuation means is formed as an extension of a main body; and a slot having a predetermined width in the guiding portion, wherein the slot is shaped and dimensioned with respect to the U-shaped actuation means of the attachment unit;

the second electric terminal module configured to establish the electrical connection with the first electric terminal module provided at the engagement unit;

the U-shaped actuation means arranged to engage with the engagement unit;

the identification means arranged to be in communication with the control module of the engagement unit, wherein the attachment unit is attachable to the battery powered personal mobility vehicle, a clamp ring attached to the main body with a fastening means;

a front clamp part provided with at least one connection hole for accommodating the fastening means to attach the main body of the attachment unit; and the main body having the U-shaped actuation means and the second electric terminal module arranged to be in contact with the first electric terminal module provided in the engagement unit, wherein the U-shaped actuation means is formed as the extension of the main body, and has a U-shaped cross-section being shaped and dimensioned with respect to the slot in the engagement unit, and wherein the control module is configured to communicate with a server and the control module is configured to control the electrical connection between the first electric terminal module and the second electrical terminal module.

16. An engagement unit for co-operation with an attachment unit, wherein the attachment unit is attachable to a battery powered personal mobility vehicle for docking and recharging, the engagement unit comprises;
   a first electric terminal module configured to establish an electrical connection with a second electric terminal module provided at the attachment unit;
   a locking means configured to secure the attachment unit when the attachment unit is in a lockable position and a U-shaped actuation means of the attachment unit is fully engaged within the engagement unit;
   a control module configured to receive an identification signal from an identification means provided in the attachment unit,
   a guiding portion extending outwardly for guiding the U-shaped actuation means of the attachment unit into the lockable position, wherein the U-shaped actuation means is formed as an extension of a main body; and
   a slot having a predetermined width in the guiding portion, wherein the slot is shaped and dimensioned with respect to the U-shaped actuation means of the attachment unit;
   the second electric terminal module configured to establish the electrical connection with the first electric terminal module provided at the engagement unit;
   the U-shaped actuation means arranged to engage with the engagement unit;
   the identification means arranged to be in communication with the control module of the engagement unit, wherein the attachment unit is attachable to the battery powered personal mobility vehicle,
   a clamp ring attached to the main body with a fastening means;
   a front clamp part provided with at least one connection hole for accommodating the fastening means to attach the main body of the attachment unit; and
   the main body having the U-shaped actuation means and the second electric terminal module arranged to be in contact with the first electric terminal module provided in the engagement unit, wherein the U-shaped actuation means is formed as the extension of the main body, and has a U- shaped cross-section being shaped and dimensioned with respect to the slot in the engagement unit,
   wherein the attachment unit comprises the clamp ring being attachable to a portion of the battery powered personal mobility vehicle when in use,
   wherein the main body is provided with the second electric terminal module arranged to be in contact with the first electric terminal module provided at the engagement unit to apply an electric voltage to the first electric terminal module by contact, and
   wherein the clamp ring is in a two-part form with a front clamp part and a rear clamp part, wherein the front clamp part and the rear clamp part of the clamp ring are provided at ends of the front clamp part and the rear clamp part with outwardly extending flaps being provided with holes for accommodating the fastening means.

17. A docking and recharging system for a battery powered personal mobility vehicle, comprising;
   a attachment unit and
   an engagement unit wherein
   the attachment unit is attachable to a battery powered personal mobility vehicle for docking and recharging, the engagement unit comprises
   a first electric terminal module configured to establish an electrical connection with a second electric terminal module provided at the attachment unit;
   a locking means configured to secure the attachment unit when the attachment unit is in a lockable position and a U-shaped actuation means of the attachment unit is fully engaged within the engagement unit;
   a control module configured to receive an identification signal from an identification means provided in the attachment unit,
   a guiding portion extending outwardly for guiding the U-shaped actuation means of the attachment unit into the lockable position, wherein the U-shaped actuation means is formed as an extension of a main body; and
   a slot having a predetermined width in the guiding portion, wherein the slot is shaped and dimensioned with respect to the U-shaped actuation means of the attachment unit;
   the attachment unit comprises:
   the second electric terminal module configured to establish the electrical connection with the first electric terminal module provided at the engagement unit;
   the U-shaped actuation means arranged to engage with the engagement unit;
   the identification means arranged to be in communication with the control module of the engagement unit, wherein the attachment unit is attachable to the battery powered personal mobility vehicle,
   a clamp ring attached to the main body with a fastening means; a front clamp part provided with at least one connection hole for accommodating the fastening means to attach the main body of the attachment unit;
   the main body having the U-shaped actuation means and the second electric terminal module arranged to be in contact with the first electric terminal module provided in the engagement unit, wherein the U-shaped actuation means is formed as the extension of the main body, and has a U- shaped cross-section being shaped and dimensioned with respect to the slot in the engagement unit;
   at least one docking station wherein the battery powered personal mobility vehicle is arranged to the at least one docking station to connect for docking and recharging in usell, and
   wherein the at least one docking station comprises the engagement unit arranged to cooperate with the attachment unit of the battery powered personal mobility vehicle in use to both lock the battery powered personal mobility vehicle and the at least one docking station together and establish the electrical connection to permit recharging of a battery of the battery powered personal mobility vehicle; and
   a server to obtain an authorization from a user to lock and recharge, wherein the server is configured to keep data of the battery powered personal mobility vehicle and the server is in communication with the control module, wherein the control module is configured to allow a remote control from a remote device by performing data information interaction with the server and the engagement unit.

* * * * *